United States Patent [19]

Johnston

[11] Patent Number: 5,299,985
[45] Date of Patent: Apr. 5, 1994

[54] CONTINUOUSLY VARIABLE TRANSMISSION APPARATUS

[76] Inventor: Thomas A. Johnston, 745 Palomar La., Colorado Springs, Colo. 80906

[21] Appl. No.: 866,559

[22] Filed: Apr. 10, 1992

[51] Int. Cl.$^5$ .......................... F16H 47/08; F16H 3/72
[52] U.S. Cl. ...................................... 475/53; 475/72; 192/58 C
[58] Field of Search .................. 74/882; 475/47, 53, 475/59, 67; 192/58 C, 3.25, 3.26, 3.21

[56] References Cited

U.S. PATENT DOCUMENTS

| 2,451,401 | 10/1948 | Mitchell et al. | 475/53 |
| 3,924,489 | 12/1975 | Yasuda | 475/53 |
| 4,120,213 | 10/1978 | Levy | 475/53 |
| 4,920,826 | 5/1990 | Theriault | 475/53 X |
| 4,928,552 | 5/1990 | Gabriele | 475/47 X |
| 4,932,928 | 6/1990 | Crockett | 475/47 X |
| 5,030,180 | 7/1991 | Johnston | 475/91 |

FOREIGN PATENT DOCUMENTS

| 908815 | 4/1954 | Fed. Rep. of Germany | 475/53 |
| 6795 | 8/1956 | Fed. Rep. of Germany | 475/53 |
| 9109239 | 6/1991 | World Int. Prop. O. | 475/53 |

Primary Examiner—Leslie A. Braun
Assistant Examiner—Khoi Ta
Attorney, Agent, or Firm—Phillip A. Rein

[57] ABSTRACT

A continuously variable transmission apparatus utilizing either a dual viscous clutch transmission means or a hydro torque converter transmission means. In one embodiment, a hydro torque converter transmission means is connected to an input shaft and interconnected to 1) a hydro torque converter and splitter means; 2) a planetary torque means; and 3) an output shaft. The hydro torque converter and splitter means is operable through a torque converter clutch assembly in order to connect a power splitter means and a torque converter assembly to the output drive shaft in a pre-selected mode. A second embodiment is a variable output transmission means operable to selectively interconnect a power splitter means, a torque converter clutch assembly, and a torque converter assembly to an output drive shaft so as to achieve a desired output in a pre-selected mode. Both embodiments of the continuously variable transmission apparatus are operable to be selectively changed from 1) an idle mode; 2) a torque multiplication mode; 3) a direct drive mode; and 4) a overdrive mode.

20 Claims, 1 Drawing Sheet

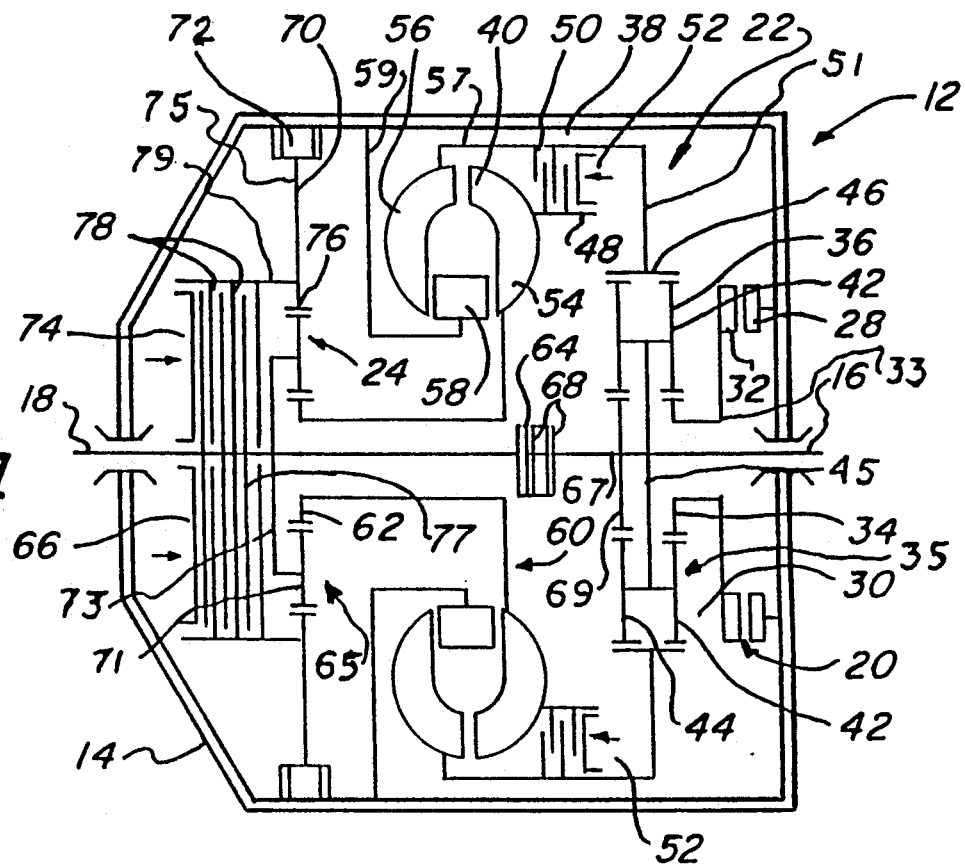
Fig_1
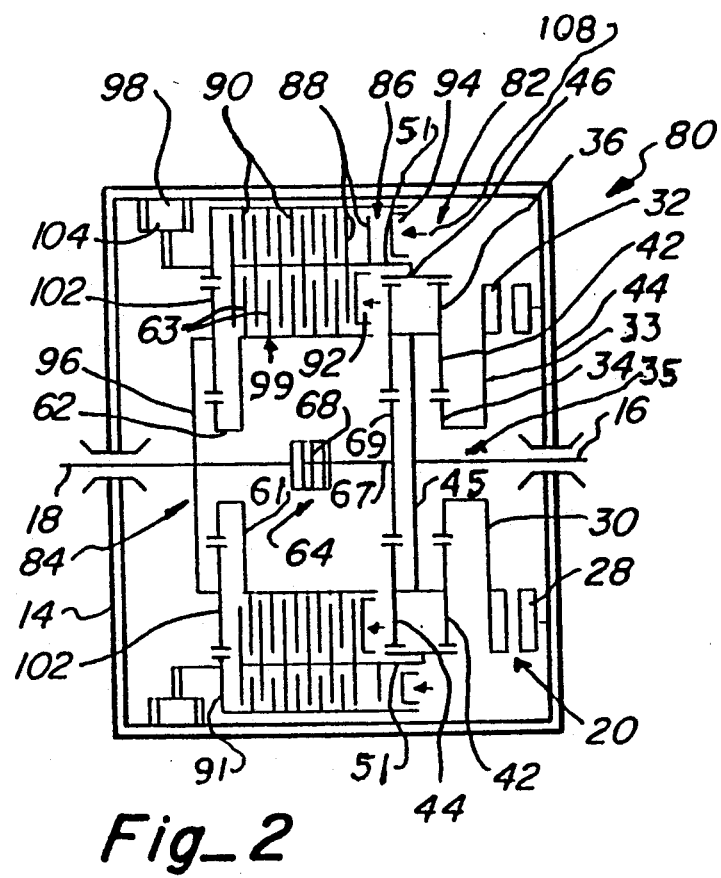
Fig_2

CONTINUOUSLY VARIABLE TRANSMISSION APPARATUS

PRIOR ART

A patent search on this invention was not conducted. The applicant herein has obtained a U.S. Pat. No. 5,030,180, issued Jul. 9, 1991, entitled "VARIABLE TRANSMISSION APPARATUS".

PREFERRED EMBODIMENT OF THE INVENTION

In preferred embodiments of this invention, a continuously variable transmission apparatus includes two embodiments being 1) a torque converter transmission means; and 2) a variable output transmission means, each mounted within a stationary housing member and interconnected between an input shaft and an output shaft to achieve a continuously variable output.

As noted in FIG. 2, the variable output transmission means includes two viscous fluid clutch means connected to an input power supply through the input shaft to transmit the input power to the output shaft.

As shown in FIG. 1, the torque converter transmission means includes 1) an overdrive clutch means connected to the input shaft and the stationary housing member; 2) a hydro torque converter and splitter means selectively connectable to the input shaft or to the overdrive clutch means; 3) a planetary torque and variable clutch means mounted between the hydro torque converter and splitter means and the output shaft being operable to power the continuously variable output.

The overdrive clutch means includes a stationary clutch member secured to the stationary housing member and a sun carrier assembly selectively connected to the stationary clutch member to achieve an overdrive power transmission condition. The sun carrier assembly includes a rotatable clutch member engagable with the stationary clutch member and connected to a.

The hydro-torque converter and splitter means includes 1) a power splitter means operably connectable to the; 2) a torque converter clutch assembly connectable to the planet splitter means; and 3) a hydro-torque converter assembly operably connected to the torque converter clutch assembly to provide power to the planetary and clutch means.

The planet gear assembly includes first and second planet gear members connected by a planet gear support member and connectable to an input ring gear member. The input ring gear member is connected to the torque converter clutch assembly.

The torque converter clutch assembly includes 1) first clutch plate members connected to the torque converter assembly; and 2) second clutch members connected by a gear clutch support member to the input ring gear member and having a clutch actuator assembly to operably and selectively interconnect the first clutch plate members and the second clutch plate members.

The torque converter assembly includes 1) a turbine member connected to the first clutch plate members and to the planetary torque and clutch means; 2) an impeller member connected to the second clutch plate members, the gear clutch support member, and the input ring gear member; 3) a stationary reactor member connected by a housing connector member to the stationary housing member; and 4) a torque sun carrier assembly to interconnect the turbine member through a sun gear support member to the torque sun gear member.

The planetary torque and clutch means includes 1) a one-way clutch assembly connectable to an input sun gear member and to the output shaft; 2) a planetary torque output assembly connectable to the output shaft from the one-way clutch assembly; 3) a variable ratio clutch assembly selectively connectable between the planetary torque output assembly, the one-way clutch assembly, and the output shaft; and 4) an output one-way clutch assembly selectively connectable to the variable ratio clutch assembly, the planetary torque output assembly, and the stationary housing member.

The planetary torque output assembly includes planetary gear members connected to a planetary gear support member and a ring gear clutch assembly.

The ring gear clutch assembly includes a clutch ring gear member connected to the variable ratio clutch assembly and the output one-way clutch assembly by a ring gear support member.

The variable ratio clutch assembly includes 1) ring gear clutch plates connected by a ring gear support member to the clutch ring gear member and the ring gear support member; 2) output clutch plates connected to the output shaft; and 3) a planetary clutch actuator operable to operably engagable the output clutch plates and the ring gear clutch plates which then provides a viscous clutch function therebetween.

In the second embodiment of this invention as noted in FIG. 2, the variable output transmission means is interconnected from an input shaft to an output shaft and mounted within a transmission housing member. The variable output transmission means includes 1) an overdrive clutch means connected to the transmission housing member; 2) a torque converter and splitter means connected to the overdrive clutch means; and 3) a planetary torque means interconnected from the torque converter and splitter means to the output shaft to provide continuous variable output from the variable output transmission means.

The overdrive clutch means, being identical to the first embodiment, includes a stationary clutch member connected to the transmission housing and operably connected to a sun carrier assembly.

The sun carrier assembly includes a rotatable clutch member engagable with the stationary clutch member and having a hollow sun gear connected thereto.

The torque converter and splitter means includes 1) a power splitter means; and 2) a torque converter clutch assembly connected to the power splitter means and connectable to the output shaft.

The power splitter means includes a planet carrier assembly connectable to the hollow sun gear. More particularly, the planet carrier assembly includes first planet gear members connectable by a planet gear support member and through a clutch input ring gear member to the torque converter clutch assembly.

The torque converter clutch assembly includes 1) input clutch plates interconnected by a gear clutch support member to the clutch input ring gear member; 2) output clutch plates connected to the planetary torque means; 3) a low range clutch actuator operable to engage the input clutch plates with one portion of the planetary torque means; 4) a high range clutch actuator operable to engage the input and output clutch plates and another portion of the planetary torque means; and 5) a torque sun carrier assembly connectable to the input clutch plates and the planetary torque means.

The torque sun carrier assembly includes a torque sun gear member connected by a sun gear support member to sun clutch plates by sun clutch plates which are operably connectable to the input clutch plates on actuation of the low range clutch actuator.

The planetary torque means includes 1) a one-way clutch assembly to interconnect the planet gear support member and the input sun gear member to the output shaft; 2) a planet gear output assembly to interconnect the torque converter clutch assembly to the output shaft; and 3) a housing one-way clutch assembly operable to interconnect the torque converter clutch assembly to the transmission housing member.

The one-way clutch assembly includes clutch members for selective interconnection to the output shaft.

The planet gear output assembly includes output planet gears connected to the torque sun gear member, the output shaft, and to an output ring gear member connected to the output clutch plates and the output clutch assembly.

OBJECTS OF THE INVENTION

One object of this invention is to provide a continuously variable transmission apparatus achieving a continuously variable power transmission output from a divided power input.

Another object of this invention is to provide a variable torque converter transmission means utilizing a combination of interacting planetary gear means and operable through a hydrodynamic fluid torque converter means to achieve a continuously variable power output.

One other object of this invention is to provide a variable torque converter transmission means including a input torque converter and splitter means operable through a planet gear means, a sun gear means, a ring gear means, and a viscous fluid torque converter means to drive an output drive means to achieve a continuously variable power output.

One further object of this invention is to provide a variable torque converter transmission means including an overdrive clutch means, a input torque converter and splitter means, and a planetary torque and clutch means to achieve a fuel-saving, efficient, and effective continuously variable power output.

Another object of this invention is to provide a variable output transmission means utilizing an overdrive clutch means, a torque converter and splitter means, and a planetary torque means in order to achieve an energy efficient continuously variable power output.

Still, one other object of this invention is to provide a continuously variable transmission apparatus which is sturdy in construction; provided with a minimum amount of movable parts relative to prior art transmission structures; and utilizing a hydrodynamic torque converter means and/or a viscous fluid clutch means to achieve a fuel-saving, efficient, continuously variable power output.

Various other objects, advantages, and features of the invention will become apparent to those skilled in the art from the following discussion, taken in conjunction with the accompanying drawings, in which:

FIGURES OF THE INVENTION

FIG. 1 is a schematic cross-sectional view of a transmission housing and operating assembly utilizing a continuously variable transmission apparatus being a torque converter transmission means and the first of this invention; and FIG. 2 is a schematic cross-sectional view of a transmission housing and operating assembly utilizing a second embodiment of this invention being a variable output transmission means.

The following is a discussion and description of preferred specific embodiments of the continuously variable transmission apparatus of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail, and in particular to FIG. 1, a continuously variable transmission apparatus being a torque converter transmission assembly or means as a first embodiment, indicated generally at 12, is utilized with a stationary transmission housing member 14 to continuously regulate and control power output from an input shaft 16 to an output shaft 18.

The torque converter transmission means 12 includes 1) an overdrive clutch means or assembly 20; 2) a hydro torque or hydrodynamic converter and splitter means or assembly 22 connected to the clutch overdrive means 20; and 3) a planetary torque and clutch assembly or means 24 connected to the hydro-torque or hydrodynamic converter and splitter means 22 and, in turn, connected to the output shaft 18.

The overdrive clutch means 20 includes a stationary clutch member 28 connected to the transmission housing member 14 and engagable with and connected to a sun carrier assembly 30.

The sun carrier assembly 30 includes 1) a rotatable clutch member 32 selectively operable to engage the stationary clutch member 28 and, in turn, connected by a sun gear support member 33 to a hollow sun gear 34.

The input torque and converter and splitter means 22 includes 1) a power splitter assembly or means 35 connected to the overdrive clutch means 20 through the hollow sun gear 34; 2) a torque converter variable clutch assembly 38 connected to the power splitter means 35; and 3) a torque converter assembly 40 connectable to the torque converter variable clutch assembly 38 and, in turn, connected to the planetary torque and clutch means 24.

The power splitter means 35 includes a planet carrier assembly 36 having a first planet gear member 42 connected by a planet gear support member 45 to second planet gear members 44 and to a input ring gear member 46.

The torque converter variable clutch assembly 38 includes 1) first clutch plates 48 connected to the torque converter assembly 40; 2) second clutch plates 50 interconnected through a ring gear clutch support shaft 51 to the input ring gear member 46; and 3) a clutch actuator assembly 52 in order to selectively and operably engage the first clutch plates 48 and the second clutch plates 50 with varying degrees of engagement.

The torque converter assembly 40 includes 1) a turbine member 54 connected to the first clutch plates 48 and, in turn, to the planetary torque and clutch means 24; 2) an impeller member 56 connected through an impeller support member 57 and the gear clutch support member 51 to the input ring gear member 46; and 3) a stationary reactor member 58 connected to the stationary housing member 14 by a housing connector member 59.

The planetary torque and clutch means 24 includes 1) a one-way clutch assembly 64 which can be operably connected between the input shaft 16 and the output shaft 18; 2) a planetary torque output assembly 65 to control connection between input torque converter and splitter means 22, the input shaft 16, and the output shaft 18; 3) a variable ratio clutch assembly 66 selectively connectable between the planetary torque output assembly 65 and the output shaft 18; and 4) an output one-way clutch assembly 72 connectable to the planetary torque output assembly 65, stationary transmission housing member 14, and the variable ratio clutch assembly 66.

The one-way clutch assembly 64 includes clutch members 68 connectable by a clutch sun gear support member 67 to an output sun gear member 69 and to the input shaft 16 through the planet carrier assembly 36.

The planetary torque output assembly 65 includes planetary gear members 71 mounted on a planet gear support member 73, a ring gear clutch support member 70 connected to the variable ratio clutch assembly 66, and a torque sun carrier assembly 60 which is connected to a torque sun gear member 62 and a support member to the turbine member 54.

The ring gear clutch support member 70 is connected to a clutch ring gear member 76 which is engagable with the planetary gear members 71.

The variable ratio clutch assembly 66 includes ring gear clutch plates 78 connected through a ring gear support member 79 to the clutch ring gear member 76 of the ring gear clutch assembly 70.

The variable ratio clutch assembly 66 is of a viscous fluid clutch type and includes a planetary clutch actuator 74 which is operable to engage the ring gear clutch plate 78 with output clutch plates 77 which, in turn, are secured to the output shaft 18.

The second embodiment of this invention, as noted in FIG. 2 is the variable output transmission assembly or means 80 mounted within the stationary housing member 14 and operable to interconnect the power input shaft 16 to the output shaft 18.

The variable output transmission means 80 includes 1) an overdrive clutch assembly or means 20 having a portion thereof connected to the transmission housing member 14; 2) a torque converter and splitter assembly or means 82 connected to the overdrive clutch means 20; and 3) a planetary torque assembly or means 84 connected to the torque converter and splitter means 82 and, in turn, to the output shaft 18.

The overdrive clutch means 20 includes 1) the stationary clutch member 28 connected to the stationary housing member 14; and 2) the sun carrier assembly 30 operable to be selectively engagable with the stationary clutch member 28.

The sun carrier assembly 30 includes the rotatable clutch member 32 which is connected by the sun gear support member 33 to the sun gear clutch member 34.

The torque converter and splitter means 82 includes the power splitter assembly or means 35 connected through a torque converter clutch assembly 86 to the planetary torque means 84.

The power splitter means 35 includes the planet carrier assembly 36 connected to the overdrive clutch means 20 and through a torque converter clutch assembly 86 to the planetary torque means 84.

The planet carrier assembly 36 includes first planet gear members 42 interconnected to second planet gear members 44 through a planet gear support member 45 which, in turn, is connected to the input shaft 16.

The planet carrier assembly 36 further includes the clutch input ring gear member 46 which is connectable by the gear clutch support member 51 to the torque converter clutch assembly 86.

The torque converter clutch assembly 86 includes 1) input clutch plates 88 connected by the gear clutch support member 51 to the input ring gear member 46; 2) output clutch plates 90 connected to an output ring gear support member 91; 3) a low range clutch actuator 92 operable to actuate input clutch plates 88 with a portion of the planetary torque means 84; and 4) a high range clutch actuator 94 operable to operably engage the input clutch plates 88 with the output clutch plates 90.

The planetary torque means 84 includes 1) a sprag clutch assembly 64 connectable between the output shaft 18 and the planet carrier assembly 36; 2) a planet gear output assembly 96 connected to the output shaft 18 and the torque converter clutch assembly 86; 3) an output clutch assembly 98 connected to the torque converter clutch assembly 86, the stationary housing member 14, and the planet gear output assembly 96; and 4) a torque sun carrier assembly 99 connected to the torque converter clutch assembly 86 and the planet gear output assembly 96.

The one-way clutch assembly 64 includes clutch members 68 for connection from the input shaft 16, the planet carrier assembly 36, and through an output sun gear member 69 to the output shaft 18 as will be explained.

The torque sun carrier assembly 99 includes a torque sun gear member 62 connected by a sun gear support member 61 to sun clutch plates 63 to the torque converter clutch assembly means 86.

The planet gear output assembly 96 includes output planet gear members 102 which are engagable with the torque sun gear member 62 and an output ring gear member 91 which is connected to the output clutch assembly 98 and the torque connector clutch assembly 86.

The output clutch assembly 98 includes an output clutch 104 which is connectable to the transmission housing member 14, the torque converter clutch 86 through the output ring gear member 91, and through the planetary torque assembly 84 to the output shaft 18.

USE AND OPERATION OF THE INVENTION

In the use and operation of the torque converter transmission means 12 of this invention as noted in FIG. 1, we are using a input torque converter and splitter means 22 to receive input from a power source driving the input shaft 16 which operates to be engaged and rotate the power splitter means 15 and the torque converter assembly 40.

The output shaft 18 is held stationary by a brake or load condition. At a low RPM of the input shaft 16, the turbine member 54 would not be driven by a rotating impeller member 56. This is in an idle mode which operates similar to the viscous torque converter clutch assembly 86 in the second embodiment being the variable output transmission means 80.

In a torque multiplication mode of the torque converter transmission means 12, the torque converter clutch assembly 38 operates to reduce and control the hydro-output ratio of the torque converter assembly 40.

This control and increased RPM of the input shaft 16 causes the torque converter assembly 40 to rotate the operating fluid therein and engage rotation of the turbine member 54. This reduces the RPM difference between the input shaft 16 and the output shaft 18.

In reaction to this rotational force, the output shaft 18 is driven at maximum torque. Then, controlled actuation of the variable ratio clutch assembly 66 reduces torque towards direct drive as the one-way clutch assembly 72 allows forward rotation of the clutch ring gear member 76.

In a direct drive mode of the torque converter transmission assembly 12, the operating control fluid within the torque converter assembly 40 interacts between the turbine member 54 and the impeller member 56 and the action of the torque converter clutch assembly 38 causes them to turn at the same RPM. In this condition, the input shaft 16, the sun gear member 69 and the output shaft 18 rotate in unity due to the one-way clutch 64 being engaged.

Next, application of the variable ratio clutch assembly 66 causes the clutch ring gear member 76 to rotate conjointly therewithin in the direct drive mode.

In an overdrive mode of the torque converter transmission means 12, the overdrive clutch means 20 is placed in a fully engaged position. In this condition, it is noted that the output sun gear clutch member 34 is locked to the transmission housing member 14 so it will not rotate.

As the planet carrier assembly 36 rotates due to input from the input shaft 16, it is noted that the first and second plane gear members 42, 44 are caused to rotate forwardly due to the stationary sun gear clutch member 34.

The first and second planet gear members 42, 44 then drive the interconnected input-ring gear member 46 at a higher RPM than the input from the input shaft 16 and the planet carrier assembly 36. The one-way sprag clutch assembly 64 allows output to exceed input which, therefore, achieves the overdrive mode condition.

It is noted that use of the torque converter clutch assembly 38 in the torque converter transmission assembly 12 instead of the viscous torque converter clutch assembly 86 of the second embodiment achieves characteristics of a torque converter assembly 40 which balances a torque requirement versus the torque available. This achieves a smooth adjustment from maximum torque mode multiplication at start-up to a one-to-one ratio or an overdrive mode condition under ideal conditions.

The four operational modes of the torque converter transmission means 12 are set forth by the respective modes indicated as follows:
I—Idle
TM—Torque multiplication
D—Direct
OD—Overdrive The status and/or rotation of the major elements of the torque converter transmission assembly 12 are indicated as follows:
+ —Forward motion
O—Off
P—Partial
F—Full
— —Reverse rotation
Z—Zero rotation

| CHART | | MODES | | | |
|---|---|---|---|---|---|
| ELEMENTS | | I | TM | D | OD |
| Torque Converter Assembly | 40 | O | P | F | F |
| Variable Ratio Clutch Assembly | 66 | O | O/P | F | F |
| Planet Carrier Assembly | 36 | + | + | + | + |
| Planet Gear Members | 71 | O | — | Z | Z |
| Torque Sun Gear | 62 | O | + | + | + |
| Output Shaft | 18 | O | + | + | + |
| Overdrive Clutch Means | 20 | O | O | O | F |

The rotational relationship or speed in terms of revolutions per minute (RPM) of the major elements of the torque converter transmission means 12 having the torque converter clutch assembly 38 expressed by the following relationships:

I—is the input speed of input shaft 16
R—is the speed of clutch ring gear member 76
C—is the speed of the output shaft 18
S—is the speed of the torque sun gear member 62
D1—is the diameter of the torque sun gear member 62
D2—is the diameter of the clutch ring gear member 76
2.2/1—is the stall torque of the tongue converter assembly The rotational relationships are expressed in the following formula:

$$R = \frac{D1 + D2}{D2}(C) - \frac{D1}{D2}(S)$$

If we assume a 6-inch diameter of the ring gear member 76 and a 1.5 inch diameter of the torque sun gear member 62, a vehicle under acceleration would show the RPM relationships charted as follows:

| | C RPM | S | I RPM | R RPM | Torque Ratio |
|---|---|---|---|---|---|
| 1) | 1 | 5 | 1000 | -0- | 7.2/1 |
| 2) | 500 | 2000 | 2500 | -0- | 4.4/1 |
| 3) | 1000 | 2500 | 2500 | 500 | 2.5/1 |
| 4) | 1500 | 2500 | 2500 | 1200 | 1.7/1 |
| 5) | 2000 | 2500 | 2500 | 1800 | 1.3/1 |
| 6) | 2500 | 2500 | 2500 | 2500 | 1/1 |

It is seen that both embodiments of the continuously variable transmission apparatus utilize a fluid type transmission, whether the viscous fluid torque converter assembly 40 or the torque converter clutch assembly 86. They are similarly operable to achieve a smooth and variable transmission of power to the output shaft receiving input from a divided or split power source being a torque converter and splitter means 22 or 82 operable to change from an idle condition to a variable torque multiplication condition to a direct drive condition and, finally, to an overdrive condition for fuel efficiency.

On referring to the second embodiment in FIG. 2, the variable output transmission means 80 utilizes a viscous torque converter and splitter means 82, the purpose of function of this embodiment is to provide a compact, uncomplicated, fuel-efficient, variable torque transmission with high torque multiplication capabilities. The variable output transmission means 80 needs a rotating power input source, such as on a milling machine or a vehicle, rotating a main drive shaft 16.

In an idle mode operation, the splitter means 35 is operable to be rotated by the input shaft 16 which operates to actuate the planet carrier assembly 36 rotating the first and second planet gear members 42, 44. This moves the first and second planet gear members 42, 44 about the outside of the output sun gear member 69.

In this condition, a brake or load is applied to the milling machine or vehicle and, therefore, the output sun gear member 69 is held stationary by the braking or load condition. This causes the first and second planet gear members 42, 44 which are engagable with the clutch input ring gear member 46 to cause same to rotate and, in turn, will rotate the input plates 88 of the torque converter clutch assembly 86.

However, since the torque converter and clutch assembly 86 is not engaged, this causes free rotation of the input clutch plates 88 and such movement is not transferred to the inner clutch plates 63, thus achieving the idle condition. In this condition, the torque converter clutch assembly 86 is in a released or disengaged condition.

Next, in a start-up mode, the low range clutch actuator 92 of the torque converter clutch assembly 86 is engaged. This causes free rotation of the output clutch plates 90 in the torque converter clutch assembly 86. This operates to engage the viscous clutch with the input clutch plates 88 and the sun clutch plates 63 and achieve a smooth start-up of the variable output transmission means 80. In this mode, the housing one-way clutch 98 holds the output ring gear member 91 stationary. The transmission thus moves from the idle mode to an output mode to drive the machinery or vehicle.

The torque torque converter variable clutch assembly 38 and the converter clutch assembly 86 are defined as one using viscous fluid which is a fluid of a viscosity of 1,000 center strokes or more measured at 77 degrees Fahrenheit (F).

In the variable torque mode, the high range clutch actuator 94 is moved in the direction of arrow 108 which causes the output clutch plates 90 to move closer to the input clutch plates 88 thereby engaging the torque converter clutch assembly 86. Then, through connection of the input clutch plates 88 and connection to the output ring gear member 91, this will impart motion to the interconnected output planet gear members 102 to the output shaft 18. The clutch ring gear member 76 is allowed to rotate forwardly by the housing one-way clutch assembly 98.

The amount of movement of the high range clutch actuator 94 regulates the closeness of the input clutch plates 88 and the output clutch plates 90 of the torque converter clutch assembly 86 which achieves a desired variable torque multiplication and output through the output drive shaft 18.

In a direct drive mode, the low range clutch actuator 92 and the high range clutch actuator 94 are operable so that the output clutch plates 90 and the input clutch plates 88 of the torque converter clutch assembly 86 substantially move as a single unit. In this condition, the output ring gear support member 91 and the torque sun gear member 62 are rotating at the same speed which causes the output drive shaft 18 to rotate as a single unit at the subject same speed. Therefore, this would transfer this direct drive on a one-to-one drive ratio to the power splitter 35 completing the direct drive connection.

In the overdrive mode, the torque converter clutch assembly remains engaged. At this time, the overdrive clutch means 20 is engaged locking the sun gear clutch member 34 to the transmission housing member 14.

As the planet carrier assembly 36 is rotated, it is seen that this will rotate the first planet gear members 42 and the second planet gear members 44 which will engagably rotate about the stationary sun gear clutch member 34. This causes the first planet gear members 42 to rotate forwardly to drive the input ring gear member 46 forwardly at a higher speed than the actual input from the planet carrier assembly 36 to achieve the overdrive condition. The one-way clutch assembly 64 allows the output shaft 18 to over speed the output sun gear member 69.

The following chart summarizes the above described modes of operation for the variable output transmission means 80 utilizing two viscous clutch assemblies and, more specifically, the torque converter clutch assembly 86 of this invention with the respective modes of operation indicated as follows:

I—Idle
—S Start
VT—Variable Torque
D—Direct
OD—Overdrive

The status and/or rotation of the major elements of the variable output transmission means 80 are indicated as follows:

+—Forward motion
O—Off
P—Partial
F—Full
——Reverse rotation
Z—Zero

CHART

| ELEMENTS | | I | S | VT | D | OD |
|---|---|---|---|---|---|---|
| Torque Converter Clutch Assembly | 86 | O | P/F | P/F | F | F |
| Input Shaft | 16 | + | + | + | + | + |
| Planet Gear Members | 102 | O | — | — | Z | Z |
| Sun Gear Member | 62 | O | + | + | + | + |
| Output Shaft Member | 18 | O | + | + | + | + |
| Overdrive Clutch Member | 28 | O | O | O | O | F |

The rotational relationship or speed in terms of revolutions per minute (RPM) of the major elements of the variable output transmission means 80 are expressed by the following relationships:

R—is the speed of clutch ring gear member 76
C—is the speed of the output shaft member 18
S—is the speed of the torque sun gear member 62
D1—is the diameter of the torque sun gear member 62
D2—is the diameter of the clutch ring gear member 76

The rotational relationships are expressed in the following formula:

$$R = \frac{D1 + D2}{D2}(C) - \frac{D1}{D2}(S)$$

If we assume that we are utilizing a 6-inch diameter clutch ring gear member 76 and a 1.5 inch diameter torque sun gear member 62, a vehicle under acceleration would show the RPM relationships charted as follows:

|    | C RPM | S RPM | R RPM | Torque Ratio |
|----|-------|-------|-------|--------------|
| 1) | 0     | 0     | 0     | 0            |
| 2) | 100   | 500   | 0     | 5/1          |
| 3) | 500   | 2500  | 0     | 5/1          |
| 4) | 1000  | 2500  | 625   | 2.5          |
| 5) | 1500  | 2500  | 1250  | 1.67         |
| 6) | 2000  | 2500  | 1875  | 1.25         |
| 7) | 2500  | 2500  | 2500  | 1/1          |

The line "1)" indicates the idle mode while line "7)" indicates the direct drive mode with the variable output achieved at the output shaft 18 from a constant input RPM from the power input shaft 16.

It is seen that the torque converter transmission means 12 and the variable output transmission means 80 both utilize a fluid type transmission, whether a viscous fluid, torque converter clutch assembly 86 or the torque converter clutch assembly 38 and the input torque converter assembly 40. They operate similarly to achieve a smooth and variable transmission of power to the output shaft having input from a divided power source operable to change from an idle condition to a variable torque multiplication condition to a direct drive condition and, finally, to an overdrive condition for fuel efficiency.

The continuously variable transmission apparatus of this invention provides a transmission means which is relatively economical to manufacture compared to prior art structures; sturdy in construction; reliable in use; operable to provide a variable degree of torque multiplication; and providing various modes of operation as needed from idle, torque mode multiplication, direct drive, and overdrive conditions.

While the invention has been described in conjunction with preferred specific embodiments thereof, it will be understood that this description is intended to illustrate and not to limit the scope of the invention, which is defined by the following claims:

I claim:

1. A continuously variable transmission apparatus usable with a power supply system to transfer power from an input shaft to an output shaft, comprising:
   a) a torque converter and splitter means connected to an input shaft to achieve rotation therefrom;
   b) said torque converter and splitter means engaging to a planetary torque means and variably rotatable therewith;
   c) said torque converter and splitter means includes a power splitter means having 1) a planet carrier assembly connected to the input shaft; and 2) a torque converter clutch assembly driven by said planet carrier assembly; and said planetary torque means driven by said torque converter clutch assembly; and
   d) said planetary torque means connected to an output shaft whereby said power splitter means is operable to achieve a variable output from said input shaft to an output shaft on operation of said torque converter clutch assembly.

2. A continuously variable transmission apparatus in a torque multiplication mode as described in claim 1, wherein:
   a) said torque converter clutch assembly is partially engaged to transfer a portion of rotation of said planet carrier assembly to said planetary torque means whereby a variable output is achieved to said output shaft depending on the amount of actuation of said torque converter clutch assembly.

3. A continuously variable transmission apparatus usable with a power supply system to transfer power from an input shaft to an output shaft, comprising:
   a) a hydrodynamic torque converter and splitter means connected to a planetary torque and clutch means;
   b) said hydrodynamic torque converter and splitter means includes a power splitter means being driven by said input shaft to achieve rotation thereof; a torque converter variable clutch assembly; and a torque converter assembly;
   c) said power splitter means having a planet carrier assembly connected to said input shaft, said torque converter variable clutch assembly having a ring gear clutch support shaft which is driven by said planet carrier assembly and connected to said planetary torque and clutch means through said torque converter assembly; and
   d) said output shaft connected to said planetary torque and clutch means and said power splitter means to be selectively driven thereby;
   whereby said hydrodynamic torque converter and splitter means and said planetary torque and clutch means are operable to achieve a variable output from said input shaft to said output shaft.

4. A continuously variable transmission apparatus usable with a power supply system to transfer power from an input shaft to an output shaft, comprising:
   a) a torque converter and splitter means having a power splitter means connected to said input shaft to achieve rotation therefrom;
   b) said power splitter means includes a planet carrier assembly connected to said input shaft and a torque converter clutch assembly driven by said planet carrier assembly;
   c) a planetary torque means having a first portion connected to said torque converter clutch assembly and a second portion connected to said output shaft; and
   d) said output shaft engagable with said torque converter and splitter means to be selectively driven thereby.

5. A continuously variable transmission apparatus usable with a power input drive shaft, such as an engine or motor, to transfer rotational torque to an output shaft, comprising:
   a) hydrodynamic torque converter and splitter means connected to a drive shaft to achieve rotation therefrom and connected to a planetary torque and clutch means which is connected to an output shaft;
   b) said hydrodynamic torque converter and splitter means includes 1) a planet carrier assembly connected to said input shaft; 2) a torque converter variable clutch assembly connected to said planet carrier assembly; and 3) a torque converter assembly connected to said torque converter variable clutch assembly;
   c) said planet carrier assembly includes an input ring gear member rotatably mounted about first and second planet gear members engagable with said torque converter assembly;
   d) said torque converter assembly having an impeller member connected to said input ring gear member and a turbine member connected to said planetary torque and clutch means; and e) said output shaft engagable with said planetary torque and clutch means to be driven thereby;

whereby said hydrodynamic torque converter and splitter means is operable to achieve a variable output from said drive shaft to said output shaft.

6. A continuously variable transmission apparatus in a torque multiplication mode as described in claim 5, wherein:
   a) said torque converter variable clutch assembly is variably engaged thereby reducing the difference in rotational speed between said planetary carrier assembly and said planetary torque and clutch means; and
   b) said planetary torque and clutch means includes a planetary torque output assembly connected to a variable ratio clutch assembly connected to said output shaft;
   whereby a variable output is achieved in said output shaft depending on the amount of actuation of said torque converter variable clutch assembly and said variable ratio clutch assembly.

7. A continuously variable transmission apparatus as described in claim 6, wherein:
   a) said variable ratio clutch assembly reduces and varies difference in speed between said planetary torque output assembly through a planetary gear support member and a clutch ring gear member to drive said output shaft.
   d) said torque converter assembly having an impeller member connected to said input ring gear member and a turbine member connected to said planetary torque and clutch means; and
   e) said output shaft engagable with said planetary torque and clutch means to be driven thereby;
   whereby said hydrodynamic torque converter and splitter means is operable to achieve a variable output from said drive shaft to said output shaft.

8. A continuously variable transmission apparatus usable with a power input shaft, such as an engine or motor, to transfer rotational torque to an output shaft, comprising:
   a) a torque converter and splitter means including a power splitter means having 1) a planet carrier assembly; 2) a torque converter clutch assembly driven by said planet carrier assembly; and 3) a planetary torque means driven by said torque converter clutch assembly and connected to an output shaft to achieve variable rotation therefrom;
   b) said planet carrier assembly includes an input ring gear member rotatably mounted about planet gear members;
   c) said torque converter clutch assembly connected to said input ring gear member and a second portion connected to said planetary torque means;
   d) said output shaft connected to said planetary torque means to be driven thereby.

9. A continuously variable transmission apparatus in torque multiplication mode as described in claim 8, wherein:
   a) said planetary torque means includes an output ring gear member connected to said torque converter clutch assembly and, when said torque converter clutch assembly is partially engaged, operates to reduce the difference in rotational speed between said output ring gear member and said input ring gear member; and
   b) said torque converter clutch assembly rotates said planetary torque assembly to rotate said output shaft.

10. A continuously variable transmission apparatus usable with a power supply system to transfer power from an input shaft to an output shaft, comprising:
    a) a torque converter and splitter means connected to an input shaft to achieve rotation therefrom;
    b) a planetary torque means is selectively connected to said torque converter and splitter means and rotatable therewith;
    c) said torque converter and splitter means includes a power splitter means having 1) a planet carrier assembly connected to the input shaft; and 2) a torque converter clutch assembly driven by said planet carrier assembly; and said planetary torque means connected to said toque converter clutch assembly;
    d) said planetary toque means connected to an output shaft whereby said power splitter means is operable to achieve a variable output from said input shaft to an output shaft on operation of said torque converter clutch assembly; and
    e) an overdrive clutch means operably connected between a transmission housing member and said power splitter means;
    whereby said overdrive clutch means in the engaged condition holds an overdrive sun gear clutch member of said power splitter means against rotation.

11. A continuously variable transmission apparatus usable with a power supply system to transfer power from an input shaft to an output shaft, comprising:
    a) a torque converter and splitter means connected to an input shaft to achieve rotation therefrom;
    b) a planetary torque means is selectively connected to said torque converter and splitter means and rotatable therewith;
    c) said torque converter and splitter means includes a power splitter means having 1) a planet carrier assembly connected to the input shaft; and 2) a torque converter clutch assembly driven by said planet carrier assembly; and said planetary torque means is selectively drive by said torque converter clutch assembly;
    d) said planetary torque means connected to an output shaft whereby said power splitter means is operable to achieve a variable output from said input shaft to an output shaft on operation of said torque converter clutch assembly;
    e) said torque converter clutch assembly includes input and output clutch plates and a high range clutch actuator;
    f) said output clutch plates engagable with said input clutch plates secured to said power splitter means; and
    g) said torque converter clutch assembly is operable in the torque multiplication mode to move said output clutch plates to a closer relationship to transfer through a viscous fluid motion therebetween to achieve a variable torque multiplication mode.

12. A continuously variable transmission apparatus as described in claim 11, wherein:
    a) said output clutch plates and said input clutch plates are moved to a fully engaged position when in a direct drive mode;
    whereby said output clutch plates and said input clutch plates are moving in the same direction at the same speed and said output shaft is moving at substantially the same speed of rotation, thus achieving the direct drive mode.

13. A continuously variable transmission apparatus usable with a power supply system to transfer power from an input shaft to an output shaft, comprising:
   a) a hydrodynamic torque converter and splitter means connected to a planetary torque and clutch means;
   b) said hydrodynamic torque converter and splitter means includes a power splitter means connected to said input shaft to achieve rotation thereof; a torque converter variable clutch assembly; and a torque converter assembly;
   c) said power splitter means having a planet carrier assembly connected to said input shaft, said torque converter variable clutch assembly having a ring gear clutch support shaft which is driven by said planet carrier assembly and connected through said torque converter assembly to said planetary torque and clutch means;
   d) said output shaft connected to said planetary torque and clutch means and said power splitter means to be selectively driven thereby;
   e) said hydrodynamic torque converter and splitter means is controlled by said torque converter variable clutch assembly which partially engages to transfer a portion of rotation of said power splitter means to a torque sun gear member and a planetary torque output assembly of said planetary torque and clutch means; and
   f) said torque sun gear member rotates said planetary torque output assembly to rotate said output shaft; whereby said hydrodynamic torque converter and splitter means and said planetary torque and clutch means are operable to achieve a variable output from said input shaft to said output shaft.

14. A continuously variable transmission apparatus as described in claim 13 in a direct drive mode, wherein:
   a) said torque converter variable clutch assembly is fully engaged to rotate said torque converter assembly at the same speed of rotation;
   b) said torque converter variable clutch assembly causes said torque sun carrier assembly and said planetary torque output assembly to rotate at the same speed; and
   c) said power splitter means contacts and rotates said output shaft at the same speed of rotation to achieve the direct drive mode.

15. A continuously variable transmission apparatus usable with a power supply system to transfer power from an input shaft to an output shaft, comprising:
   a) a hydrodynamic torque converter and splitter means connected to a planetary torque and clutch means;
   b) said hydrodynamic torque converter and splitter means includes a power splitter means connected to said input shaft to achieve rotation thereof; a torque converter variable clutch assembly; and a torque converter assembly;
   c) said power splitter means having a planet carrier assembly connected to said input shaft, said torque converter variable clutch assembly having a ring gear clutch support shaft which is driven by said planet carrier assembly and connected through said torque converter assembly to said planetary torque and clutch means;
   d) said output shaft connected to said planetary torque and clutch means and said power splitter means to be selectively driven thereby;
   e) an overdrive clutch means selectively operably connected between a transmission housing member and said planet carrier assembly; and
   f) said overdrive clutch means operable in the engaged position to hold a sun gear member of said power splitter means in a non-rotatable condition; whereby said hydrodynamic torque converter and splitter means and said planetary torque and clutch means are operable to achieve a variable output from said input shaft to said output shaft.

16. A continuously variable transmission apparatus usable with a power supply system to transfer power from an input shaft to an output shaft, comprising:
   a) a torque converter and splitter means having a power splitter means connected to said input shaft to achieve rotation therefrom;
   b) said power splitter means includes a planet carrier assembly connected to said input shaft and a torque converter clutch assembly driven by said planet carrier assembly;
   c) a planetary torque means having a first portion connected to said torque converter clutch assembly and a second portion connected to said output shaft;
   d) said output shaft engagable through said planetary torque means to said torque converter and splitter means so as to be selectively driven thereby; and
   e) said torque converter clutch assembly is partially engaged to transfer a portion of rotation of said planet carrier assembly to said planetary torque means whereby a variable output is achieved to said output shaft depending on the amount of actuation of said torque converter clutch assembly.

17. A continuously variable transmission apparatus usable with a power supply system to transfer power from an input shaft to an output shaft, comprising:
   a) a torque converter and splitter means having a power splitter means connected to said input shaft to achieve rotation therefrom;
   b) said power splitter means includes a planet carrier assembly connected to said input shaft and a torque converter clutch assembly driven by said planet carrier assembly;
   c) a planetary torque means having a first portion connected to said torque converter clutch assembly and a second portion connected to said output shaft;
   d) said output shaft engagable through said planetary torque means to said torque converter and splitter means so as to be selectively drive thereby; and
   e) an overdrive clutch means selectively operably connected between a transmission housing member and said power splitter means; whereby said overdrive clutch means in the engaged condition holds an overdrive sun gear clutch member of said power splitter means against rotation.

18. A continuously variable transmission apparatus usable with a power supply system to transfer power from an input shaft to an output shaft, comprising:
   a) a torque converter and splitter means having a power splitter means connected to said input shaft to achieve rotation therefrom;
   b) said power splitter means includes a planet carrier assembly connected to said input shaft and a torque converter clutch assembly driven by said planet carrier assembly;

c) a planetary torque means having a first portion connected to said torque converter clutch assembly and a second portion connected to said output shaft;

d) said output shaft engagable through said planetary torque means said torque converter and splitter means so as to be selectively driven thereby;

e) said torque converter clutch assembly includes input and output clutch plates and a clutch actuator;

f) said input clutch plates are driven by said planet carrier assembly;

g) said output clutch plates are connected to a housing one-way clutch assembly; and h) said clutch actuator is operable in the torque multiplication mode to move said input clutch plates and said output clutch plates to a closer relationship to transfer through a viscous fluid motion therebetween to achieve the variable torque multiplication mode.

19. A continuously variable transmission apparatus as described in claim 18, wherein:

a) said input clutch plates and said output clutch plates are moved to a fully engaged position when in a direct drive mode;

whereby said input clutch plates and said output clutch plates are moving int he same direction at the same speed and said output shaft is moving at substantially the same speed of rotation, thus achieving the direct drive mode.

20. A continuously variable transmission apparatus usable with a power input shaft, such as an engine or motor, to transfer rotational torque to an output shaft, comprising:

a) a torque converter and splitter means including a power splitter means having 1) a planet carrier assembly; 2) a torque converter clutch assembly driven by said planet carrier assembly and 3) a planetary torque means connected to said torque converter clutch assembly and to an output shaft to achieve rotation therefrom;

b) said planet carrier assembly includes an input ring gear member rotatably mounted about planet gear members;

c) said torque converter clutch assembly connected to said input ring gear member and a second portion connected to said planetary torque means;

d) said output shaft connected to said planetary torque means to be driven thereby;

e) said planetary torque means includes an output ring gear member engageable with said torque converter clutch assembly and, when said torque converter clutch assembly is selected to be partially engaged, operates to reduce the difference in rotational speed between said output ring gear member and said input ring gear member;

f) said torque converter clutch assembly rotates said planetary torque assembly to rotate said output shaft;

g) said planetary torque means includes a torque sun gear member engageable with said torque convertor clutch assembly; and h) said torque converter clutch assembly selectively reduces and varies difference in speed between said torque sun gear member and said output ring gear member to drive said output shaft.

* * * * *